United States Patent [19]

Harris

[11] Patent Number: 5,237,302

[45] Date of Patent: Aug. 17, 1993

[54] FAIL SAFE SWITCH

[75] Inventor: Timothy S. Harris, Fort Wayne, Ind.

[73] Assignee: Kransco, San Francisco, Calif.

[21] Appl. No.: 934,790

[22] Filed: Aug. 24, 1992

[51] Int. Cl.$^5$ .......................... H01H 85/00; H02P 1/16
[52] U.S. Cl. ........................................ 337/4; 307/113;
318/446; 361/104
[58] Field of Search ..................... 318/446; 180/272;
307/113, 115, 137; 200/1 R; 361/104; 337/4, 12

[56] References Cited

U.S. PATENT DOCUMENTS

| | | |
|---|---|---|
| 2,260,084 | 10/1941 | Mosley . |
| 2,535,271 | 12/1950 | Denslow . |
| 3,939,314 | 2/1976 | Loeser . |
| 4,217,400 | 8/1980 | Leffingwell . |
| 4,224,383 | 9/1980 | Taylor . |
| 4,292,616 | 9/1981 | Andersen . |
| 4,447,760 | 5/1984 | Koo . |
| 4,555,451 | 11/1985 | Harrod et al. . |
| 5,051,550 | 9/1991 | Harris . |

Primary Examiner—Harold Broome
Attorney, Agent, or Firm—Kolisch, Hartwell, Dickinson, McCormack & Heuser

[57] ABSTRACT

A free-wheeling safety switch is intended for controlling a power supply for a motor and includes a linked single-throw conductor and a double-throw conductor. A fusible link is located between the poles of the conductors. A connection between the double-throw conductor and the single-throw conductor switches the conductors sequentially such that the double-throw conductor switches between its normally closed position and its switched position prior to the single-throw conductor shifting from its normally-off position to its on position. The single-throw conductor is switched from its on position to its off position before the double throw conductor switches to its normally closed position. The power supply is electrically connected to the motor only when the double-throw conductor is in its switched position and the single-throw conductor is in its on position.

10 Claims, 3 Drawing Sheets

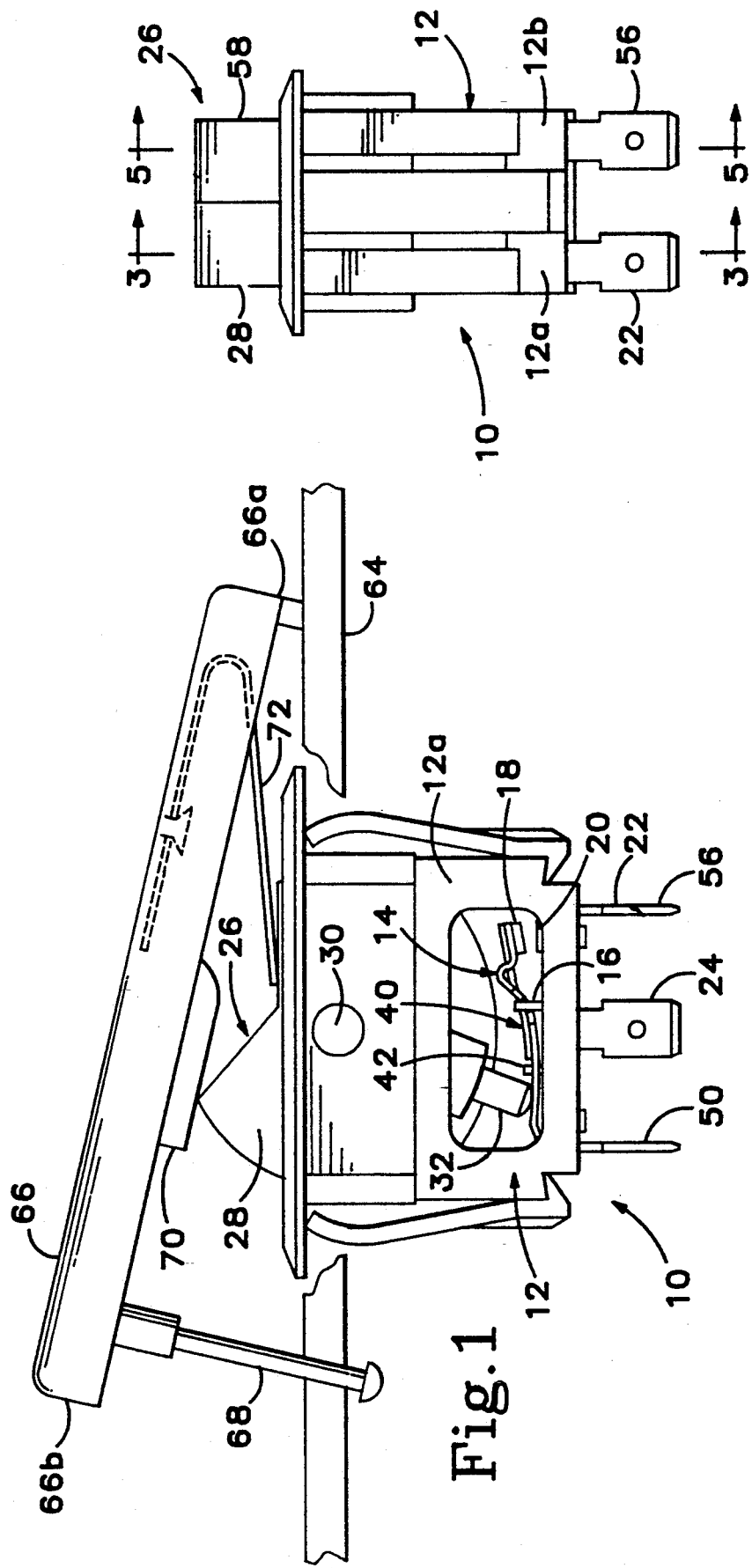

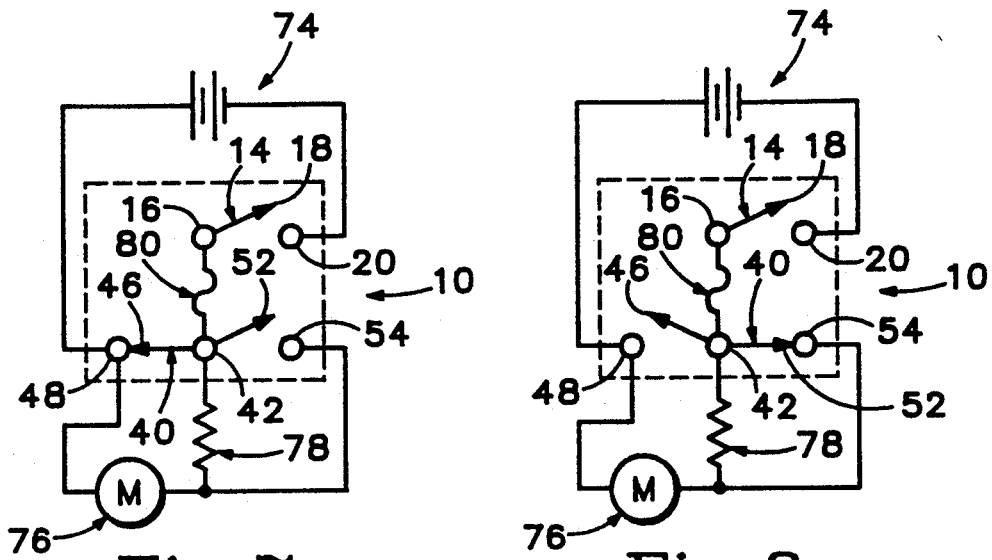
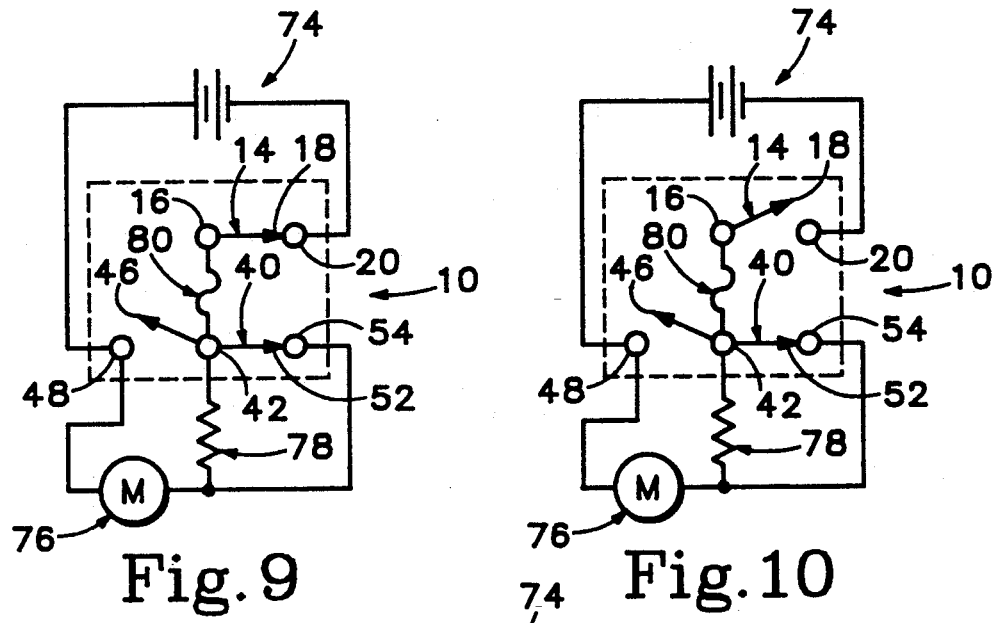
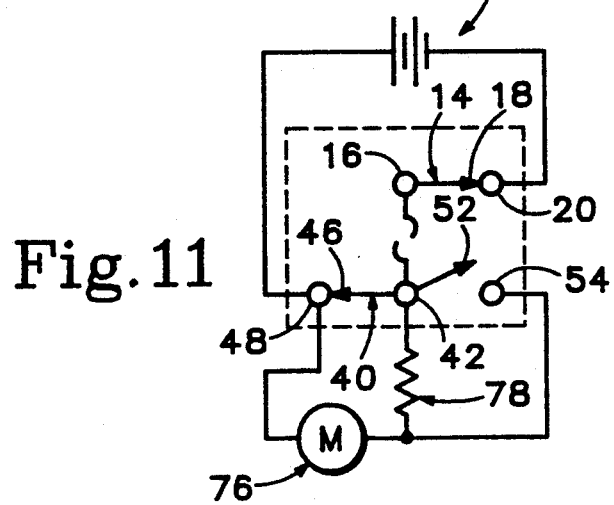

FAIL SAFE SWITCH

BACKGROUND AND SUMMARY OF THE INVENTION

The present invention relates to a free-wheeling safety switch which is used for controlling the connection of a power supply to a motor. In particular, the present invention relates to a safety which is intended for use on a child's ride-on vehicle.

A number of forms of child's ride-one vehicles are known. One such vehicle is described in U.S. Pat. No. 4,558,263, entitled ALL TERRAIN VEHICLE TOY WITH DYNAMIC BRAKING. A usual feature of such ride-on vehicles is the provision of a battery, an electric motor, and a switching mechanism which is used to connect the battery to the electric motor, thereby allowing the child who is operating the vehicle to cause the vehicle to stop or go. Additional features are provided, such as reversing switches and dynamic braking circuits. The vehicles are generally powered by six to eighteen volt batteries.

As may be expected when such electromotive force is used, there is a potential for the contacts of a switch to weld with the sudden application of current from a battery power source. In certain circumstances, it is possible that a switch may weld in an "on" position, which would prevent the motor on the vehicle from being switched "off", leading to a runaway condition. Such a condition, aside from being a potential safety hazard, may also scare the child operating the vehicle.

The switch of the invention is designed to overcome the problems heretofore associated with switching mechanisms for ride-on vehicles and to also provide a positive, deliberate short circuit through a fusible link in the event that a contact in the safety switch becomes welded.

Accordingly, it is an object of the invention to provide a safety switch which will be operable to break the connection between battery and a motor even if a switch contact has welded into a closed position.

Another object of the invention is to provide a safety switch having sequentially operated, multiple conductors therein.

Another object of the invention is to provide a safety switch which is compact, easy to manufacture, and which may be easily replaced in the event of a welded contact.

A further object of the invention is to provide a safety switch which includes a free-wheeling, intermediate position.

The free-wheeling safety switch of the invention is intended for controlling a power supply for a motor and includes a linked single-throw conductor and a double-throw conductor. The double-throw conductor includes a center pole, a first, normally-closed contact, and a second, normally-open contact. The double-throw conductor is switchable from a normally closed position to a switched position wherein the first contact is open and the second contact is closed. The single-throw conductor includes a pole and a contact which is switchable between a normally-off position and an on position. A fusible link is located between the center pole and the single throw pole. The link between the double-throw conductor and the single-throw conductor switches the conductors sequentially such that the double-throw conductor switches between its normally closed position and its switched position prior to the single-throw conductor shifting from its normally-off position to its on position. The single-throw conductor is switched from its on position to its off position before the double throw conductor switches to its normally closed position. The power supply is electrically connected to the motor only when the double-throw conductor is in its switched position and the single-throw conductor is in its on position.

These and other objects and advantages of the invention will become more fully apparent as the description which follows is read in conjunction with the drawings.

BRIEF DESCRIPTION OF THE DRAWINGS

FIG. 1 is a side elevation of the safety switch of the invention, with portions broken away to show interior detail.

FIG. 2 is an end elevation of the switch of FIG. 1.

FIG. 7 is a schematic diagram of a control circuit incorporating the safety switch of the invention, with the switch in an "off" position.

FIG. 8 depicts the switch in an intermediate "off" position.

FIG. 9 depicts the switch in an "on" position.

FIG. 10 depicts the switch in a free-wheeling, intermediate position.

FIG. 11 depicts the switch in a fault mode.

DETAILED DESCRIPTION OF THE PREFERRED EMBODIMENT

Turning now to the drawings, and initially to FIGS. 1 and 2, the safety switch of the invention is depicted generally at 10. Switch 10 includes a switch housing 12 which contains the various conductors and contacts for the switches therein. Housing 12 includes a single-throw housing portion 12a and a double-throw housing portion 12b.

Figure 3:
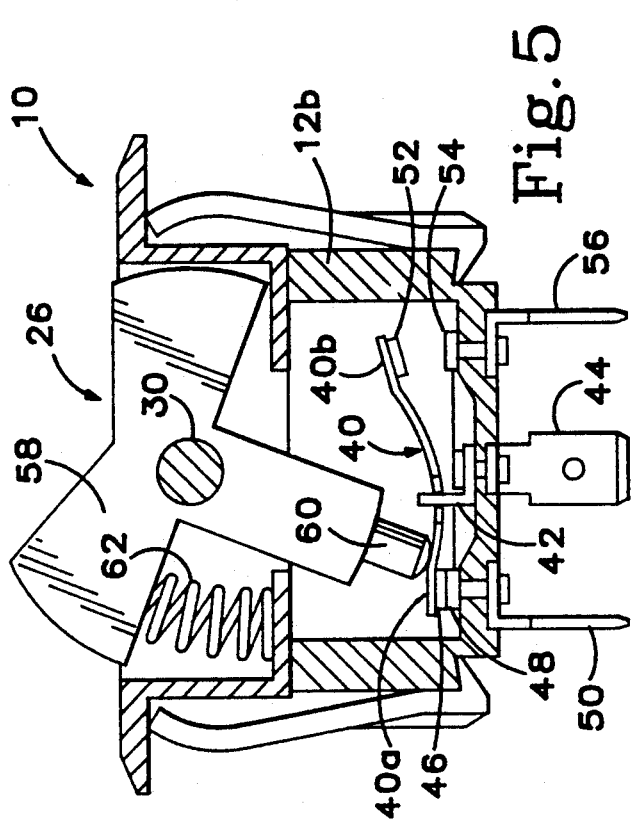
FIG. 3 is a side elevation of the switch depicting a single throw conductor in a normally "off" position.
Figure 4:
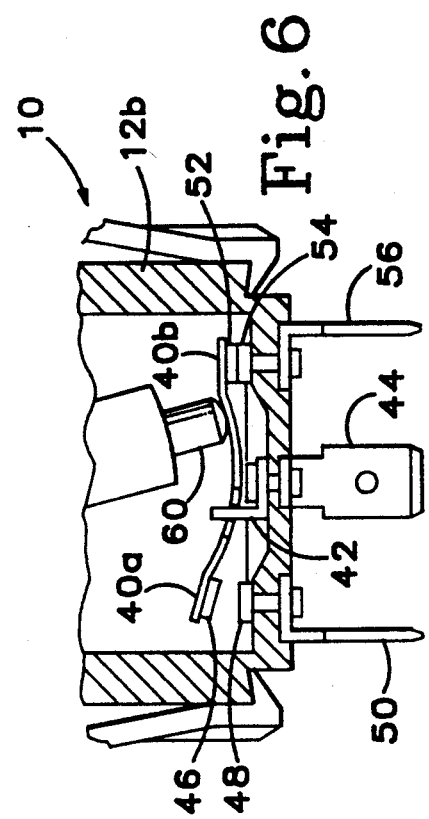
FIG. 4 depicts the conductor of FIG. 3 in an "on" position.

Referring now to FIGS. 1, 3 and 4, a single-throw conductor 14, and its associated structure, will be described. A single-throw conductor 14 is supported by a fulcrum 16 which is located close to the conductor one end 14a, which has a contact 18 thereon. Conductor contact 18 makes contact with a stationary contact 20 which is connected through housing 12 to a spade connector 22. The other end 14b, in the preferred embodiment, is in insulated contact with the interior of housing 12 when the single-throw conductor is in its normally "off" position. Fulcrum 16 comprises a pole for the single-throw conductor and is connected to a center pole spade 24.

Single-throw conductor 14 is switched between its normally "off" position and its "on" position by a rocker mechanism shown generally at 26. Mechanism 26 includes a rocker element 28 which is pivotable on a pin 30. A rod 32 is slidably received within a bore 34 in rocker element 28, and is outwardly biased by a spring 36 to maintain contact with single-throw conductor 14. Another spring 38 is provided to bias rocker element 28 in a manner to maintain single-throw conductor 14 in its normally "off" position. Spring 38 comprises part of what is referred to herein as a biasing mechanism. As is depicted in FIGS. 3 and 4, when rocker element 28 is shifted between its normally-biased position, shown in FIG. 3, to its switched position, depicted in FIG. 4, single-throw conductor 14 is shifted between its normally-open position and its "on" position, wherein contacts 18 and 20 form an electrical connection between spade connectors 22 and 24. Such shifting between the single-throw conductor positions occurs as rod 32 approaches the one end 14a of single-throw conductor 14, as it passes over fulcrum 16.

Referring now to FIGS. 1, 2, 5 and 6, a double-throw conductor 40 will be described. Double-throw conductor 40 is contained in double-throw housing portion 12b and is mounted on a double-throw fulcrum 42, which serves as a center pole, and is connected to double-throw center pole spade connector 44.

Double-throw conductor 40 has one end 40a having a first, normally-closed contact 46 thereon, which is normally-closed in connection with a first housing contact 48, which is connected to a spade connector 50. The other end 40b of double-throw conductor 40 includes a normally-open contact 52, which when closed, makes contact with a second housing contact 54, which is connected to a spade connector 56.

Rocker mechanism 26 includes a second rocker element 58, which is also carried on double-throw housing portion 12b and which coacts with double-throw conductor 40 to shift the conductor between its normally-closed contact and its second, normally-open contact. To this end, second rocker element 58 is pivoted on pin 30, and includes a rod 60, which is mounted in the same manner as is rod 32 in first rocker element 28. A coil spring 62 biases second rocker element 58 to the position wherein double-throw conductor 40 is in its normally-closed position. Spring 62 forms another part of what is referred to herein as the biasing mechanism.

Figure 5:
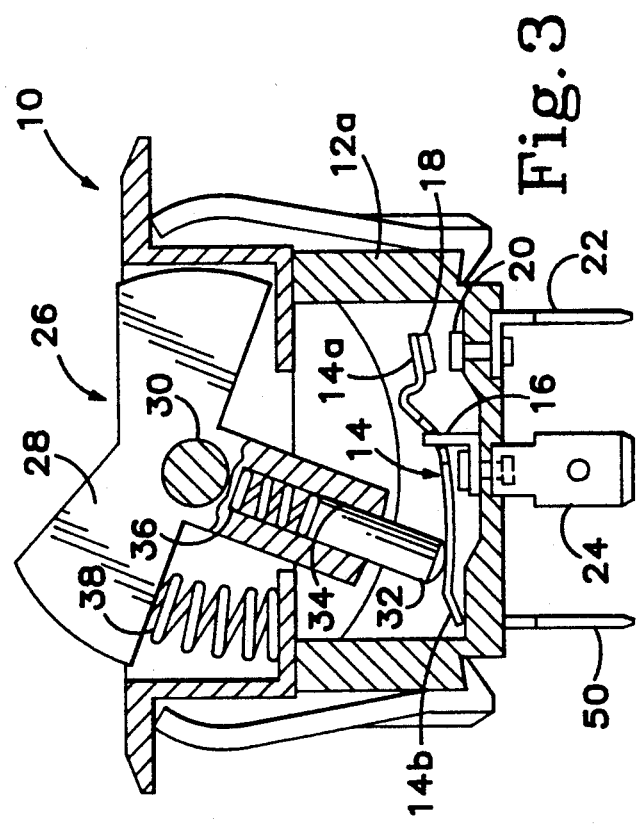
FIG. 5 is a side elevation depicting a double-throw conductor in a normally-closed position.
Figure 6:
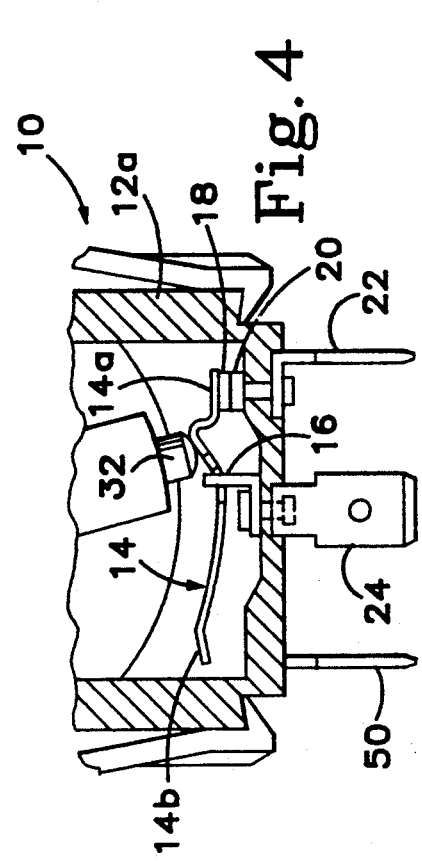
FIG. 6 is a side elevation of the conductor of FIG. 5 in a switched position.

Referring now to FIGS. 1, 3 and 5, the arrangement of fulcrums 16 and 42 will be discussed. As previously noted, single-throw conductor fulcrum 16 is located adjacent conductor one end 14a. Double-throw conductor fulcrum 42 is located adjacent the normally-closed contact on conductor one end 40a. As rocker mechanism 26 is shifted between the "off" and "on" positions, rod 60 will pass over the location of fulcrum 42, thereby shifting double-throw conductor 40 at a time prior to when rod 32 passes over fulcrum 16, which causes single-throw conductor 14 to switch.

Conversely, when the rocker mechanism is released, and allowed to shift back to its biased "off" position, rod 32 will pass over fulcrum 16 prior to the passage of rod 60 over fulcrum 42, thereby causing the single-throw conductor to switch prior to the switching of the double-throw conductor.

Referring to FIG. 1, switch 10 is depicted in an environmental setting, wherein the switch is mounted in a ride-on vehicle floor board 64 under an accelerator pedal 66. Pedal 66 is pivoted at one end 66a thereof in floor board 64, and has a fastener 68 connected to the other end 66b thereof to prevent pedal 66 from separating from the vehicle.

A pedal tab 70 is located on the underside of pedal 66 and contacts rocker elements 28 and 58 to switch conductors 14 and 40 from their normal positions to their switched positions. A folded leaf spring 72 is provided to (1) provide a return for accelerator pedal 66 and (2) to provide the remaining portion of the biasing mechanism, which causes rocker elements 28 and 58 to return to their normal positions regardless of whether or not coil springs 38 and 62 are operable or not. Details about folded leaf spring 72 are disclosed in my U.S. Pat. No. 5,051,550, granted Sep. 24, 1991 for CONTROL MECHANISM FOR AN ON-OFF SWITCH, which is incorporated herein by reference.

Referring now to FIG. 7, switch 10 is depicted in schematic with a power supply 74, a motor 76, a back EMF resistor 78 and a fusible link 80. Back EMF resistor 78 is located between switch 10 and motor 76. Fusible link 80 is located between pole 16 and pole 42. FIG. 7 depicts switch 10 in an "off", or back EMF condition, wherein power from power supply 74, which in the preferred embodiment, takes the form of a six to eighteen volt battery, is not connected to motor 76. Motor 76 is of the DC variety, and if it is turning under an inertial force, will be braked by back EMF through resistor 78, with the contacts of switch 10 in the positions depicted in FIG. 7.

FIG. 8 depicts an intermediate condition where double-throw conductor 40 is thrown, with contacts 52, 54 being closed and contacts 46, 48 being open. Under these conditions, no current will flow from power supply 74 to motor 76.

FIG. 9 depicts the "run" condition, wherein both single-throw conductor 14 and double-throw conductor 40 have been shifted to their "on" positions, thereby providing current from power supply 74, through fusible link 80 to motor 76.

FIG. 10 depicts an intermediate condition as in FIG. 8, and assuming that the vehicle has been running, will provide a "free-wheeling" condition, where the flow of current from power supply 74 is no longer reaching motor 76, but wherein back EMF is not applying a braking force, as contacts 46 and 48 are open.

As will be readily apparent to those of ordinary skill in the art, the contacts on double-throw conductor 40 will not be subjected to any arcing during opening or closing, as there is no current flowing when the contacts on double-throw conductor 40 either open or close, because such opening and/or closing will always occur with single-throw conductor 14 in its "open" position. Single-throw conductor 14 is, however, subject to arcing as it closes and opens as it will be making and braking connections between power supply 74 and motor 76.

As previously noted, under some circumstances, contacts 18 and 20 may weld shut, thereby preventing single-throw conductor 14 from opening. This condition is depicted in FIG. 11. Should such an event occur, single-throw conductor 14 will remain closed, and double-throw conductor 40 will provide a direct connection between the poles of power supply 74. Assuming that power supply 74 is adequately charged, such a connection will cause fusible link 80 to blow, thereby stopping the flow of current from power supply 74 to motor 76. In such circumstances, it will be necessary to replace safety switch 10 before the ride-on vehicle may be used again. While this may cause some slight inconvenience, it is preferable to having a run-away ride-on vehicle with the problems attendant therewith.

Thus, a safety switch for a child's ride-on vehicle has been disclosed. The switch features a pair of conductors, which are sequentially thrown such that one of the conductors is always switched without a load on a power supply, thereby eliminating any possibility of welding contacts on that conductor. Another conductor is provided to absorb such potentially arcing conditions, and, if that conductor becomes welded closed, a fusible link will break the circuit, thereby preventing a runaway ride-on vehicle.

Although a preferred embodiment of the invention has been disclosed herein, it should be appreciated that further modifications and variations may be made thereto without departing from the scope of the invention as defined in the appended claims.

What I claim is:

1. A free-wheeling safety switch for controlling a power supply for a motor, comprising:
    a double-throw conductor, having a center pole, a first, normally-closed contact, and a second, normally-open contact, wherein the double-throw conductor is switchable from a normally closed position to a switched position wherein the first contact is open and the second contact is closed;
    a single-throw conductor having a pole and a contact which is switchable between a normally-off position and an on position;
    a fusible link located between the center pole and the single throw pole; and
    a connection between the double-throw conductor and the single-throw conductor which switches the conductors sequentially such that the double-throw conductor switches between its normally closed position and its switched position prior to the single-throw conductor shifting from its normally-off position to its on position, and wherein the single-throw conductor is switched from its on position to its off position before the double throw conductor switches to its normally closed position; wherein the power supply is electrically connected to the motor only when the double-throw conductor is in its switched position and the single-throw conductor is in its on position.

2. The safety switch of claim 1 which includes a fulcrum mount for each conductor, and wherein the fulcrum mount associated with the double-throw conductor is located adjacent the first contact and the fulcrum associated with the single-throw conductor is located adjacent the contact therefore.

3. The safety switch of claim 1 wherein the fusible link will break the electrical connection between the motor and the power supply if the single throw conductor fails to switch to its open position before the double-throw conductor shifts to its normally-closed position.

4. The safety switch of claim 1 wherein the double-throw conductor and the single-throw conductor are contained in a single housing.

5. The safety switch of claim 1 wherein the connection is spring biased to maintain the conductors in their normal positions.

6. A free-wheeling safety switch for electrically connecting a power supply to a motor, comprising:
    a double-throw conductor, having a center pole, a first, normally-closed contact, and a second, normally-open contact, wherein the double-throw conductor is switchable from a normally closed position to a switched position wherein the first contact is open and the second contact is closed;
    a single-throw conductor having a pole and a contact which is switchable between a normally-off position and an on position;
    a fusible link located between the center pole and the single throw pole; and
    a connection between the double-throw conductor and the single-throw conductor which switches the conductors sequentially such that the double-throw conductor switches between its normally closed position and its switched position prior to the single-throw conductor shifting from its normally-off position to its on position, and wherein the single-throw conductor is switched from its on position to its off position before the double throw conductor switches to its normally closed position, and wherein the power supply is electrically connected to the motor only when the double-throw conductor is in its switched position and the single-throw conductor is in its on position.

7. The safety switch of claim 6 which includes a fulcrum mount for each conductor, and wherein the fulcrum mount associated with the double-throw conductor is located adjacent the first contact and the fulcrum associated with the single-throw conductor is located adjacent the contact therefore.

8. The safety switch of claim 6 wherein the fusible link will break the electrical connection between the motor and the power supply if the single throw conductor fails to switch to its open position before the double-throw conductor shifts to its normally-closed position.

9. The safety switch of claim 6 wherein the double-throw conductor and the single-throw conductor are contained in a single housing.

10. The safety switch of claim 6 wherein the connection is spring biased to maintain the conductors in their normal positions.

* * * * *